United States Patent Office 2,882,949
Patented Apr. 21, 1959

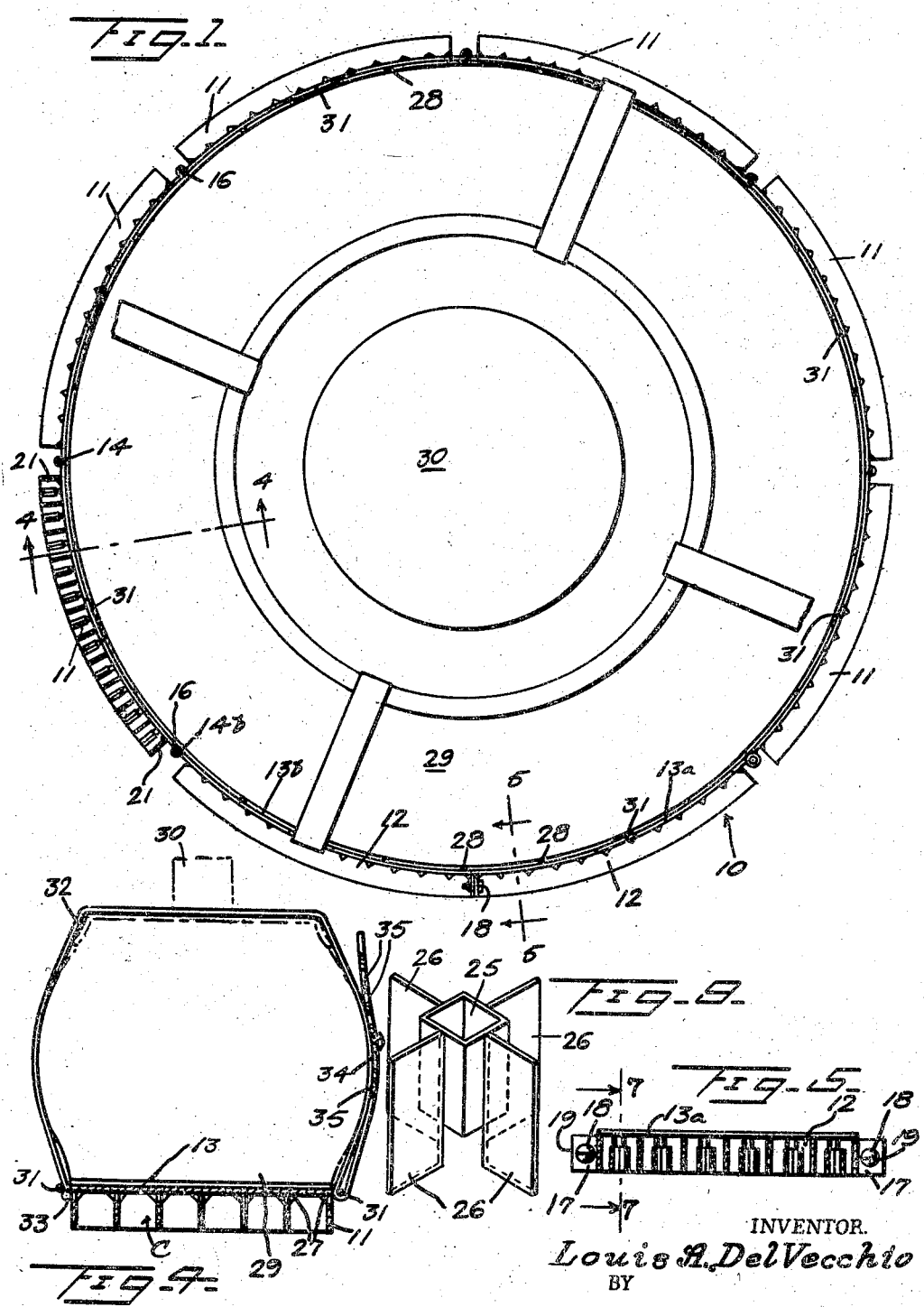

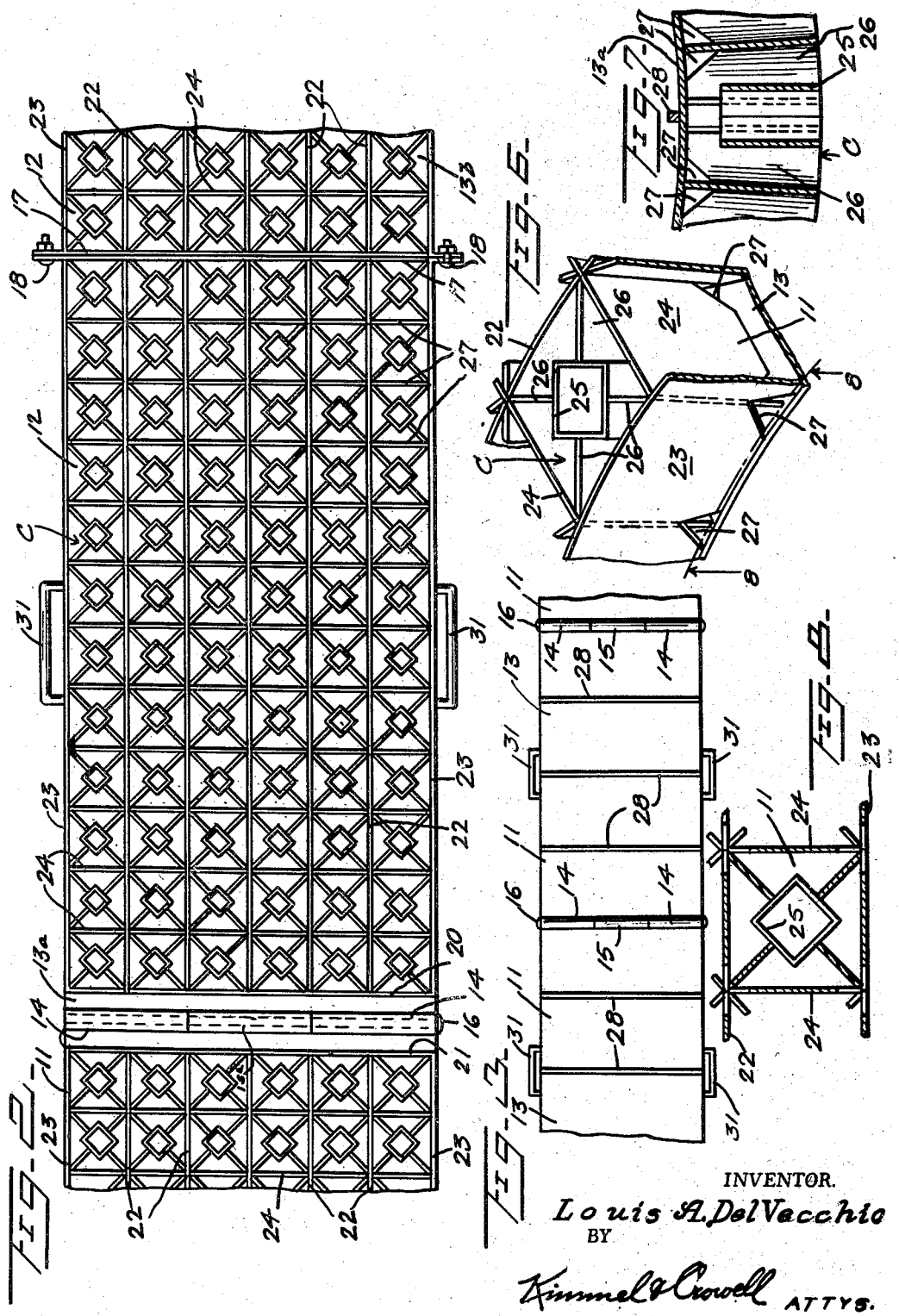

2,882,949
ANTI-SKID ATTACHMENT FOR MOTOR VEHICLE WHEELS

Louis A. Del Vecchio, East Boston, Mass.

Application February 27, 1958, Serial No. 717,911

3 Claims. (Cl. 152—181)

The present invention relates to anti-skid attachments for motor vehicle wheels and particularly to such devices which can be applied and removed by the driver as the need arises.

The primary object of the invention is to provide an anti-skid attachment for motor vehicle wheels which is shaped to fit the perimeter of the tire and includes a plurality of sections hingedly secured together at their juncture.

Another object of the invention is to provide an anti-skid attachment of the class described above having means thereon for eliminating packed and caked snow therefrom.

A further object of the invention is to provide an anti-skid attachment for motor vehicle wheels in which interchangeable end sections are provided to fit the device to wheels of different diameters.

A still further object of the invention is to provide an anti-skid attachment of the class described above which is inexpensive to manufacture, simple to use, and which is completely effective in eliminating skidding on mud, snow or ice.

Other objects and advantages will become apparent in the following specification when considered in the light of the attached drawings in which:

Figure 1 is a fragmentary side elevation of the invention shown applied to one wheel of the motor vehicle partially broken away and in section for convenience of illustration.

Figure 2 is an enlarged fragmentary plan view of the invention.

Figure 3 is a view similar to Figure 2 of the opposite side of the device.

Figure 4 is an enlarged fragmentary transverse cross-section taken along the line 4—4 of Figure 1 looking in the direction of the arrows.

Figure 5 is an enlarged fragmentary transverse cross-section taken along the line 5—5 of Figure 1 looking in the direction of the arrows.

Figure 6 is a fragmentary perspective view of one of the anti-skid cells of the invention.

Figure 7 is an enlarged fragmentary vertical cross-section taken along the line 7—7 of Figure 5 looking in the direction of the arrows.

Figure 8 is a fragmentary horizontal cross-section taken along the line 8—8 of Figure 6 looking in the direction of the arrows.

Figure 9 is a fragmentary perspective view of cell C.

Referring now to the drawings in detail wherein like reference characters indicate like parts throughout the several figures, the reference numeral 10 indicates generally an anti-skid attachment for motor vehicle wheels constructed in accordance with the invention.

The anti-skid attachment 10 is formed from a plurality of arcuate sections 11 each identical in construction and a pair of end sections 12 operatively connected to the sections 11. Each of the sections 11 include an arcuate base plate 13 of generally rectangular cross section having spaced apart hinge barrels 14 extending transversely across one end and a single hinge barrel 15 positioned centrally of the opposite end. The hinge barrels 14 are spaced apart and receive the hinge barrel 15 therebetween with hinge pintles 16 extending therethrough vertically securing the plates 13 together. One of the sections 12 has an arcuate base plate 13a with a central hinge barrel 15a formed on one end thereof. The second section 12 is provided with an arcuate base plate 13b having spaced transversely extending hinge barrels 14b formed on one end thereof identical to the hinger barrels 14. The hinge barrel 15a is pivotally mounted to a pair of the hinge barrels 14 by means of a hinge pintle 16 and the hinge barrels 14b are pivottally secured to a hinge barrel 15 by means of a hinge pintle 16.

The base plates 13a and 13b at the ends thereof opposite the hinge barrels 15a and 14b are each provided with an upright end wall 17. The end wall 17 extends beyond the side edges of the base plates 13a and 13b respectively and are secured together by bolts 18 extending through the opposite ends thereof. The bolts 18 have a slot 19 formed in one end thereof to receive a coin to loosen the bolts 18 in the absence of tools.

An end wall 20 is arranged parallel to the end wall 17 at the end of the base plate 13a opposite thereto and the end wall 20 is spaced from the respective hinge barrels 15a and 14b.

The sections 11 are provided with upright parallel opposite end walls 21 spaced from the respective hinge barrels 14 and 15, as is best seen in Figure 2. The sections 12 between the end walls 17 and 20 and the sections 11 between the end walls 21 are provided with a plurality of longitudinally extending spaced parallel intermediate walls 22 and a pair of oppositely disposed side walls 23. A plurality of spaced parallel transverse walls 24 are positioned between the side walls 23 between the end walls 17, 20 and the end walls 21.

The spacing between the walls 24 and the walls 22 is substantially equal so that a plurality of relatively square cells generally indicated at C are formed. Each of the cells C have a rectangular tubular member 25 positioned centrally therein with the sides thereof extending at an angle of 45° to the walls 22, 24. The rectangular tubular member 25 is substantially shorter than the cell C and terminates at a point spaced from the base plate 13, as best shown in Figure 9. A plurality of diagonal plates 26 extend inwardly from each corner of the cell C and are secured centrally of the sides of the rectangular tubular member 25. The plates 26 are each welded to the corners of the cell C and to the rectangular tubular member 25. Each of the walls 20, 21, 22, 23 and 24 at the corner of the cells C are angularly truncated as at 27 to provide an escape passage for snow and ice entering the opposite end of the cell C.

The base plates 13, 13a and 13b are each provided with a centrally positioned outwardly projecting metallic loop 31 on each side edge thereof.

A flexible strap 32 having an enlarged head 33 on one end thereof is engaged through one of the loops 31 through the wheel 30 and through the opposite loop 31 to secure the anti-skid attachment 10 to the wheel 30. The strap 32 is provided with a tang 34 and a plurality of spaced apertures 35 which are arranged to engage over the tang 34 to secure the strap 32 in position on the wheel 30.

In the use and operation of the invention a plurality of sections 11 are provided and attached to end sections 12 which have a length sufficient to cause the anti-skid attachment 10 to snugly fit the perimeter of a tire 29 on a wheel 30. The end walls 17 of the end sections 12 are secured together by the bolts 18 and the straps 32 are passed through the wheel 30 and secured in place on the loops 31 to detachably fasten the anti-skid attachment 10 to the wheel 30. As the device travels on snow the snow which might otherwise cake in the cells C passes outwardly through the openings 27, as above described.

Having thus described the preferred embodiment of the invention it should be understood that numerous structural modifications and adaptations may be resorted to without departing from the scope of the appended claims.

What is claimed is:

1. In an anti-skid attachment for motor vehicle wheels a rigid arcuate section comprising an arcuate generally rectangular base plate, a plurality of spaced parallel longitudinally extending walls, a plurality of spaced parallel transversely extending walls, said longitudinally extending walls and said transversely extending walls delienating a plurality of cells, a rectangular tubular member positioned in each of said cells, and means rigidly securing said rectangular tubular members to the corners of each of said cells.

2. A device as claimed in claim 1 wherein attachment loops are integrally secured to opposite side edges of said base plate and hinge barrels are integrally formed on opposite ends of said base plate.

3. A device as claimed in claim 1 wherein said longitudinally extending walls and said transversely extending walls are truncated at their juncture adjacent said base plate to provide snow escape passages from said cell.

References Cited in the file of this patent

UNITED STATES PATENTS

| | | |
|---|---|---|
| 1,402,364 | Koch | Jan. 3, 1927 |
| 1,468,204 | Horton | Sept. 18, 1923 |